(12) United States Patent
Mauermann et al.

(10) Patent No.: US 6,763,568 B1
(45) Date of Patent: Jul. 20, 2004

(54) METHOD, DEVICE AND RIVET FOR EFFECTING A MECHANICAL JOINING

(75) Inventors: Reinhard Mauermann, Dresden (DE);
Wolfgang Voelkner, Dresden (DE);
Guenter Berger, Dresden (DE)

(73) Assignee: Technische Universitaet Dresden, Dresden (DE)

( * ) Notice: Subject to any disclaimer, the term of this patent is extended or adjusted under 35 U.S.C. 154(b) by 0 days.

(21) Appl. No.: 10/018,281

(22) PCT Filed: Jun. 14, 2000

(86) PCT No.: PCT/DE00/02010

§ 371 (c)(1),
(2), (4) Date: Jun. 12, 2002

(87) PCT Pub. No.: WO00/76688

PCT Pub. Date: Dec. 21, 2000

(30) Foreign Application Priority Data

Jun. 14, 1999 (DE) .......................................... 199 27 103

(51) Int. Cl.⁷ ............................ B23P 11/00; B21D 39/00
(52) U.S. Cl. .................. 29/432.2; 29/524.1; 29/525.06; 29/798; 29/243.53
(58) Field of Search ....................... 29/243.521, 243.53, 29/512, 523, 524.1, 525.06, 432, 798, 432.2; 411/501; 403/274; 72/391.4

(56) References Cited

U.S. PATENT DOCUMENTS

| 3,613,981 A | * | 10/1971 | Ramseier ...................... 227/1 |
| 3,653,243 A | * | 4/1972 | Ramseier ...................... 72/122 |
| 3,762,199 A | * | 10/1973 | Yoshikawa ...................... 72/67 |
| 3,800,579 A | * | 4/1974 | Breiter ...................... 29/243.53 |
| 4,041,596 A | * | 8/1977 | Mink ...................... 29/243.53 |
| 4,146,118 A | * | 3/1979 | Zankl ...................... 411/501 |
| 5,205,030 A | * | 4/1993 | Uno ...................... 29/243.53 |
| 5,752,305 A | * | 5/1998 | Cotterill et al. ............ 29/432.2 |
| 6,089,062 A | * | 7/2000 | Zemp ...................... 72/21.4 |
| 6,161,273 A | * | 12/2000 | Rivera et al. ............ 29/525.06 |
| 6,338,601 B1 | * | 1/2002 | Mauer et al. ............... 29/432.2 |
| 6,473,957 B1 | * | 11/2002 | Voelkner et al. ............. 29/505 |
| 6,546,613 B2 | * | 4/2003 | Donovan ................. 29/525.06 |

FOREIGN PATENT DOCUMENTS

| DE | 4333052 | 3/1995 |
| DE | 19602075 | 5/1997 |
| DE | 19701150 | 7/1998 |
| EP | 0893180 | 1/1999 |

\* cited by examiner

Primary Examiner—David P. Bryant
(74) Attorney, Agent, or Firm—Jordan and Hamburg LLP

(57) ABSTRACT

The invention relates to a method for mechanically joining stacked, plate-shaped objects, especially metal sheets by means of punch riveting with a semitubular rivet while using tools placed above and below the objects, whereby the semitubular rivet linearly penetrates into the objects. The inventive method is characterized in that, during the axial feed motion of the semitubular rivet, the upper tool and/or a portion of the lower tool is/are subjected to a wobbling additional movement in a radial and/or tangential direction. The invention also relates to an apparatus and to the semitubular rivet which are used for carrying out the method.

4 Claims, 3 Drawing Sheets

METHOD, DEVICE AND RIVET FOR EFFECTING A MECHANICAL JOINING

Figure 1:
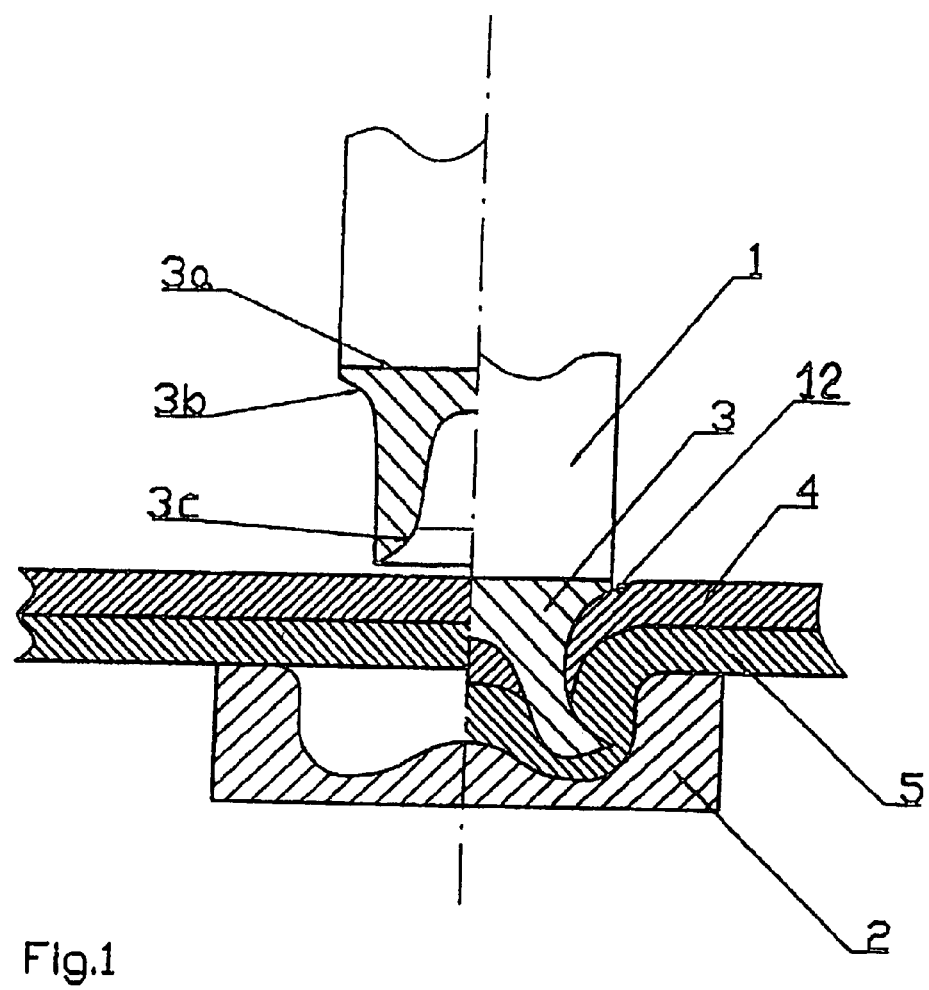

The invention relates to a method, a device and a rivet for mechanical joining by means of punch riveting.

In known punch riveting with semitubular rivets the rivet is joined into the sheets to be joined by a linear movement without a prepunched hole.

In known clinching a punch penetrates during the working stroke in a linear motion into the sheets to be joined, whereby on the opposite side a solid or split die takes part in forming the die side of the clinch spot. A counterpunch is positioned in the split die.

The known wobbling movement is used for the forming of a rivet head on the face side by partial compressive deformation. The movement is also used in clinching, i.e. joining without using an auxiliary joining part (DE 198 43 874.5).

In known punch riveting heavy forces are required during the linear punch motion. Therefore the tool load is high which limits the application for high-strength sheet materials.

For the C-frames preferably used as tool frames, heavy forces limit the capacity and hence, the applicability of the method.

Due to the flow of the sheet material and the additional deformation of the rivet, a specific shape of the joint results during the linear punch movement.

It is the objective of this invention to reduce the forces occurring in punch riveting. This aims at extending the field of application of this process concerning high-strength materials and the accessibility of C-frames for large workpieces. It is another objective of this invention to eliminate the process's weak points of drawing-in of the head and low expansion and thus to achieve a better appearance and higher joining strengths in equivalent joining jobs.

According to the invention, the problem is solved by a method in which, during the axial feeding motion of the semitubular rivet, the upper tool or/and a portion of the lower tool are given a wobbling additional movement in radial and/or tangential direction.

This additional movement is superimposed on the axial feeding motion during the whole or part of the joining process. The wobbling movement can take place tangentially, e.g. in a circular motion, radially outward from the centre, e.g. in a pivoting motion, and in a combined motion tangentially/radially, e.g. in a rosette kinematics. Due to the wobbling movement the material is partially deformed which distinctly reduces the process forces.

Advantageously, for punch riveting with semitubular rivet a rivet is used the head of which has a convex elevation and the shank inner and outer contours of which beginning from the rivet foot in direction to the rivet head are shaped such that a continuous increase of the cross-sectional area of the rivet shank occurs.

It is also advantageous, for a simultaneous active additional movement of the upper tool and a portion of the lower tool, to make these move synchronously such that the introduce axial forces of the punches oppose each other directly.

According to the invention, the problem is further solved by a device by means of which the upper tool or/and a portion of the lower tool as counterpunch can be moved in a wobbling manner in radial and/or tangential directions.

In the device according to the invention, at least one of the tools (upper tool, a portion of the lower tool as counterpunch) is displaced in a wobbling manner in addition to the known axial feed motion. Both opposing tools can execute this wobbling motion simultaneously and, in a special embodiment, synchronizedly.

Advantageously, the die of the device is a split die. This allows to realize a special material flow on the die side of the joint.

In an embodiment of the device with only the upper tool wobbling, the lower tool, which in other case is split, is designed as a one-piece part According to the invention, the problem is further solved by a rivet whereby the shank inner and outer contours, beginning from the rivet foot in direction of the rivet head, are shaped such that a continuous increase of the cross-sectional area of the rivet shank results.

Advantageously, the rivet has a convex elevation at the rivet head.

It is also advantageous that the inner and outer profiles of the semitubular rivet are described by two tractrix curves in each case whereby the start points of the curves are situated in direction of the rivet foot and rivet head, respectively, and the transition of the curves is tangential in the centre.

Figure 2:
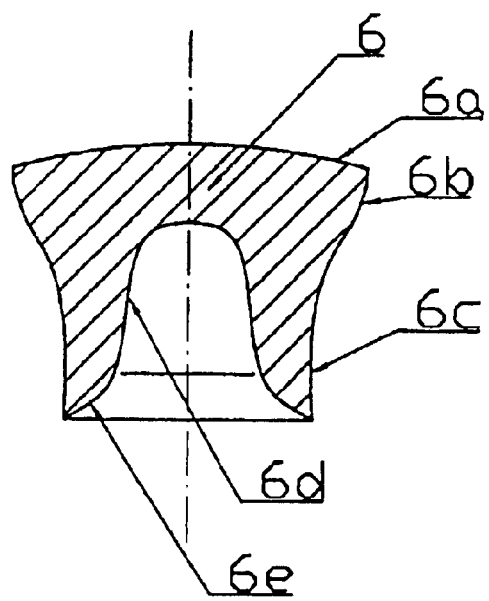
Figure 3:
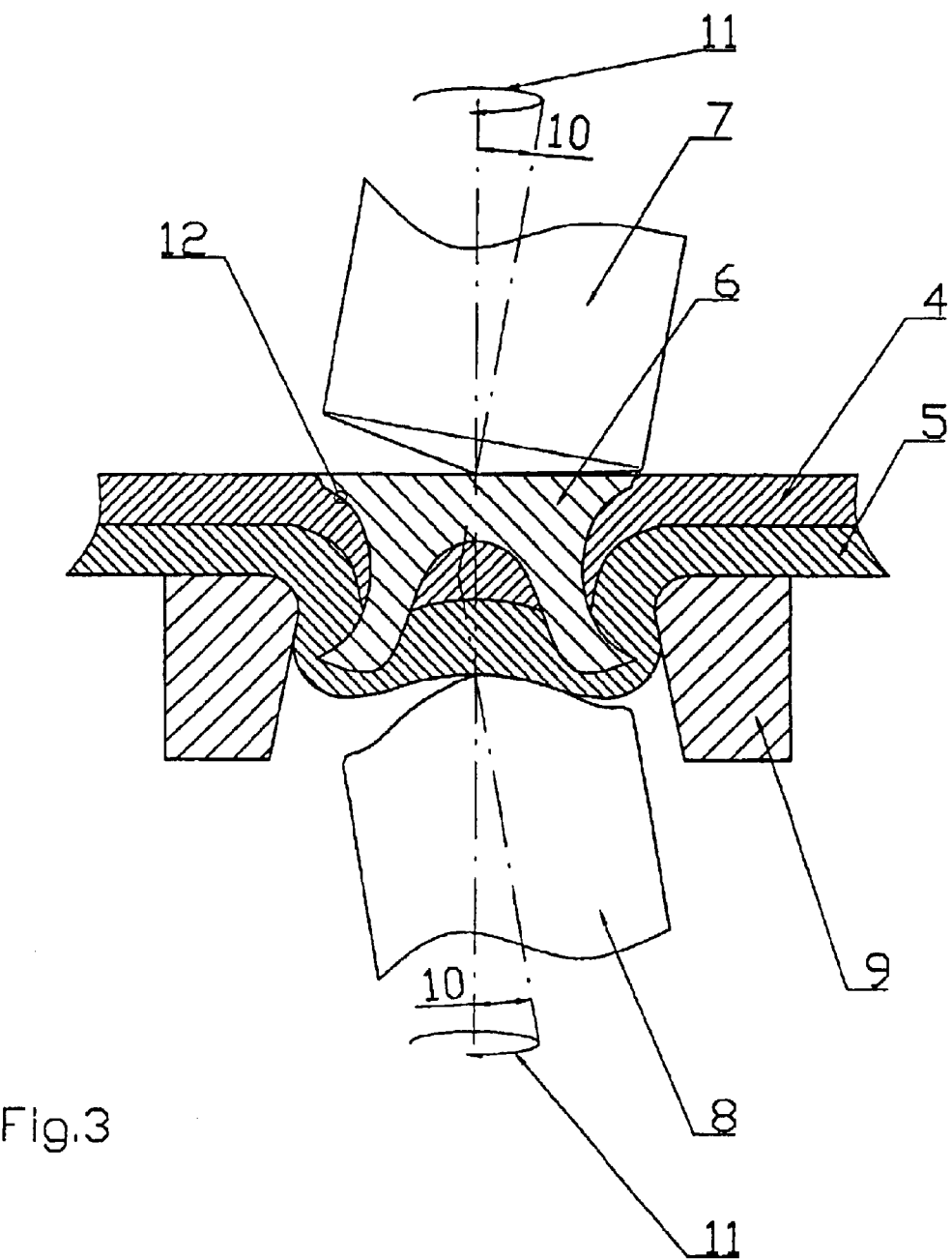

In the following, the invention is further explained by examples of embodiment. In the drawings it is shown by FIG. 1 a representation of state-of-the-art punch riveting;

FIG. 2 a semitubular rivet according to the invention;

FIG. 3 a representation of punch riveting with superimposed wobbling movement.

In FIG. 1 the known punch riveting with punch 1 and fixed die 2 is represented. The standard semitubular rivet 3 penetrates in an axial movement into the sheets to be joined 4 and 5. This rivet usually has a flat head 3a, a radius 3b and a chamfer 3c.

In FIG. 2 a semitubular rivet 6 adapted to the wobbling movement is shown. It has a material accumulation in form of a convex elevation at the rivet head 6a. Therefore the introduced force is concentrated mainly on the area of the rivet head centre in the first period of the process, wherefrom the cutting forces to cut the upper sheet are passed to the rivet foot. The periphery of the rivet head is plastified only at the end of the joining process, when the entire rivet head is formed flat. The additional rivet material of the convex elevation is displaced radially outwards during flat forming. With the resulting increase of the rivet head diameter the drawing-in zone 12 in the upper sheet is reduced. Further the contours of the semitubular rivet 6 are described by two tractrix curves each. The start points of the tractrix outer contour are situated at the rivet foot (curve 6c) and rivet head (curve 6b). The start points of the tractrix inner contour are also at the rivet foot (curve 6e) and at the upper point of the inner contour (curve 6d).

The inner curves 6d and 6e and the outer curves 6b and 6c are connected to each other by a tangential transition. This aims at increasing the cross sectional area of the rivet, which is an annular area in the lower portion and a circular area in the upper portion, continuously beginning from the rivet foot. Therefore, in every cross-section the bending moment which increases beginning from the rivet foot during joining can be taken into account and no weak points develop at chamfer or radius, respectively at transition points. Owing to this design of the rivet the loads developing during partial deformation can be absorbed in an improved way and the undesired compression of the rivet foot can be reduces. A better expansion develops and hence a higher strength of the joint.

In FIG. 3 the riveting process with superimposed wobbling movement 11 is shown in its final phase. As a wobbling movement 11 a movement is superimposed that describes a rosette or a circle. The synchronizedly wobbling tools, upper tool 7—punch—and lower tool 8—here the counterpunch as portion of the lower tool—swivel at a maximum wobbling angle 10 whereby this angle is between 1° and 10°, preferably 3°.

NOMENCLATURE

1—punch
2—fixed die
3—standard semitubular rivet
3*a*—flat head
3*b*—radius
3*c*—chamfer
4—punch-side sheet
5—die-side sheet
6—semitubular rivet
6*a*—convex elevation at the rivet head
6*b*—upper smaller tractrix curve at the outer contour
6*c*—lower bigger tractrix curve at the outer contour
6*d*—upper smaller tractrix curve at the inner contour
6*e*—lower bigger tractrix curve at the inner contour
7—upper tool
8—portion of the lower tool
9—split die with inner cone
10—wobbling angle
11—wobbling movement
12—drawing-in

What is claimed is:

1. Method for mechanical joining of stacked plate-shaped objects comprising punch riveting with a semitubular rivet using tools situated above and below the objects whereby the semitubular rivet penetrates linearly into the objects, wherein during axial feeding movement of the semitubular rivet the upper tool and/or a portion of the lower tool are given a wobbling additional movement in radial and/or tangential direction.

2. Method of claim 1 wherein the rivet has a head having a convex elevation and a shank having an inner contour and an outer contour which are shaped with a continuous increase of the cross-sectional area of the shank from a foot of the rivet to a head of the rivet.

3. Method of claim 1 or 2, wherein the wobbling additional movement comprises synchronized, simultaneous wobbling additional movement of the upper tool and a portion of the lower tool.

4. Method of claim 1 or 2, wherein the wobbling additional movement is carried out with a wobbling angle of from 1° to 10°.

* * * * *